US009772876B2

(12) United States Patent
Archer et al.

(10) Patent No.: US 9,772,876 B2
(45) Date of Patent: Sep. 26, 2017

(54) EXECUTING AN ALL-TO-ALLV OPERATION ON A PARALLEL COMPUTER THAT INCLUDES A PLURALITY OF COMPUTE NODES

(71) Applicant: International Business Machines Corporation, Armonk, NY (US)

(72) Inventors: Charles J. Archer, Hillsboro, OR (US); Nysal Jan K.A., Bangalore (IN); Sameh S. Sharkawi, Cypress, TX (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 14/148,337

(22) Filed: Jan. 6, 2014

(65) Prior Publication Data
US 2015/0193271 A1  Jul. 9, 2015

(51) Int. Cl.
 G06F 15/16 (2006.01)
 G06F 9/48 (2006.01)
 G06F 9/50 (2006.01)
 G06F 9/54 (2006.01)

(52) U.S. Cl.
 CPC .......... G06F 9/4843 (2013.01); G06F 9/5061 (2013.01); G06F 9/546 (2013.01)

(58) Field of Classification Search
 CPC ........... G06F 9/4843; G06F 9/485; G06F 9/48
 See application file for complete search history.

(56) References Cited

U.S. PATENT DOCUMENTS

| | | | |
|---|---|---|---|
| 4,145,739 A * | 3/1979 | Dunning | G06F 3/0601 709/211 |
| 4,403,286 A | 9/1983 | Fry et al. | |
| 4,484,264 A | 11/1984 | Friedli et al. | |
| 4,873,630 A | 10/1989 | Rusterholz et al. | |
| 4,945,473 A | 7/1990 | Holtey et al. | |
| 5,175,818 A | 12/1992 | Kunimoto et al. | |
| 5,202,981 A | 4/1993 | Shackelford | |
| 5,231,485 A | 7/1993 | Israelsen et al. | |

(Continued)

OTHER PUBLICATIONS

Bruck et al., Efficient Algorithms for All-to-All Communications in Multiport Message-Passing Systems; Nov. 1997; IEEE; 1143-1156.*

(Continued)

Primary Examiner — Yves Dalencourt
(74) Attorney, Agent, or Firm — Brandon C. Kennedy; Feb Cabrasawan; Kennedy Lenart Spraggins LLP

(57) ABSTRACT

Executing an all-to-allv operation on a parallel computer that includes a plurality of compute nodes, including: packing, by each task in an operational group of tasks, vectored contribution data from vectored storage in an all-to-allv contribution data buffer into an all-to-all contribution data buffer, wherein two or more entries in the all-to-allv contribution data buffer are different in size and each entry in the all-to-all contribution data buffer is identical in size; executing with the contribution data as stored in the all-to-all contribution data buffer an all-to-all collective operation by the operational group of tasks; and unpacking, by each task in the operational group of tasks, received contribution data from the all-to-all contribution data buffer into the vectored storage in an all-to-allv contribution data buffer.

11 Claims, 9 Drawing Sheets

(56) References Cited

U.S. PATENT DOCUMENTS

| | | | | |
|---|---|---|---|---|
| 5,247,616 | A * | 9/1993 | Berggren | G06F 15/173 709/208 |
| 5,517,662 | A | 5/1996 | Coleman et al. | |
| 5,557,744 | A | 9/1996 | Kobayakawa et al. | |
| 5,884,046 | A * | 3/1999 | Antonov | G06F 17/30067 707/E17.01 |
| 6,047,122 | A * | 4/2000 | Spiller | G06F 9/4843 718/108 |
| 6,052,737 | A | 4/2000 | Bitton et al. | |
| 6,085,277 | A | 7/2000 | Nordstrom et al. | |
| 6,141,701 | A | 10/2000 | Whitney | |
| 6,173,330 | B1 | 1/2001 | Guo et al. | |
| 6,212,617 | B1 * | 4/2001 | Hardwick | G06F 8/457 345/505 |
| 6,233,619 | B1 * | 5/2001 | Narisi | H04L 29/06 709/227 |
| 6,334,138 | B1 * | 12/2001 | Kureya | G06F 15/17368 709/201 |
| 6,360,262 | B1 | 3/2002 | Guenthner et al. | |
| 6,366,583 | B2 | 4/2002 | Rowett et al. | |
| 6,427,171 | B1 | 7/2002 | Craft et al. | |
| 6,678,726 | B1 | 1/2004 | Moshaiov | |
| 6,697,868 | B2 | 2/2004 | Craft et al. | |
| 6,751,676 | B2 | 6/2004 | Fukuhara | |
| 6,757,725 | B1 | 6/2004 | Frantz et al. | |
| 6,757,744 | B1 * | 6/2004 | Narisi | H04L 29/06 709/250 |
| 6,781,537 | B1 * | 8/2004 | Taraschuk | H03M 1/0836 341/137 |
| 7,093,263 | B1 * | 8/2006 | Sexton | G06F 9/4435 714/E11.207 |
| 7,362,709 | B1 | 4/2008 | Hui et al. | |
| 7,817,655 | B1 | 10/2010 | Bennett et al. | |
| 7,941,800 | B2 * | 5/2011 | Leis | G06F 9/45537 718/1 |
| 8,161,480 | B2 | 4/2012 | Archer et al. | |
| 8,200,857 | B2 | 6/2012 | Noeldner et al. | |
| 8,219,776 | B2 | 7/2012 | Forhan et al. | |
| 8,281,053 | B2 | 10/2012 | Archer et al. | |
| 2001/0005381 | A1 * | 6/2001 | Sugiyama | H04Q 11/0478 370/466 |
| 2002/0062389 | A1 * | 5/2002 | Vertes | G06F 9/54 709/238 |
| 2002/0143962 | A1 * | 10/2002 | Carter | H04L 29/06 709/229 |
| 2003/0014544 | A1 | 1/2003 | Pettey | |
| 2003/0041176 | A1 | 2/2003 | Court et al. | |
| 2004/0003131 | A1 | 1/2004 | Curtis | |
| 2004/0013117 | A1 * | 1/2004 | Hendel | H04L 49/90 370/394 |
| 2004/0039672 | A1 * | 2/2004 | Zivic | G06Q 40/06 705/36 R |
| 2004/0042487 | A1 | 3/2004 | Ossman | |
| 2004/0095237 | A1 | 5/2004 | Chen et al. | |
| 2004/0199732 | A1 * | 10/2004 | Kelley | G06F 9/3814 711/158 |
| 2004/0230794 | A1 * | 11/2004 | England | G06F 9/45537 713/164 |
| 2004/0249957 | A1 * | 12/2004 | Ekis | H04L 69/16 709/228 |
| 2004/0250253 | A1 * | 12/2004 | Khartabil | G06F 9/545 719/310 |
| 2005/0021680 | A1 * | 1/2005 | Ekis | G06F 9/5044 709/219 |
| 2005/0144367 | A1 | 6/2005 | Sinclair | |
| 2006/0004933 | A1 | 1/2006 | Sen et al. | |
| 2006/0005186 | A1 * | 1/2006 | Neil | G06F 9/4555 718/1 |
| 2006/0036570 | A1 * | 2/2006 | Schaefer | G06F 9/44505 |
| 2006/0104295 | A1 * | 5/2006 | Worley | G06F 9/544 370/401 |
| 2006/0136531 | A1 * | 6/2006 | Ng | G06F 7/74 708/100 |
| 2006/0206904 | A1 * | 9/2006 | Watkins | G06F 9/45537 719/321 |
| 2006/0294234 | A1 | 12/2006 | Bakke et al. | |
| 2007/0011272 | A1 * | 1/2007 | Bakke | G06F 9/5027 709/217 |
| 2007/0083638 | A1 | 4/2007 | Pinkerton et al. | |
| 2007/0124474 | A1 * | 5/2007 | Margulis | G06F 3/14 709/226 |
| 2007/0204265 | A1 * | 8/2007 | Oshins | G06F 9/4856 718/1 |
| 2008/0022079 | A1 * | 1/2008 | Archer | G06F 9/542 712/225 |
| 2008/0288263 | A1 * | 11/2008 | Jung | G10L 19/167 704/500 |
| 2009/0132863 | A1 * | 5/2009 | Ashfield | G06F 11/3466 714/45 |
| 2010/0017420 | A1 * | 1/2010 | Archer | G06F 15/17337 707/E17.009 |
| 2010/0185718 | A1 * | 7/2010 | Archer | G06F 9/4856 709/201 |
| 2013/0246438 | A1 | 9/2013 | Gestrelius et al. | |
| 2014/0337572 | A1 * | 11/2014 | Weimer | G06F 12/023 711/114 |
| 2015/0067436 | A1 * | 3/2015 | Hu | G06F 11/1008 714/758 |

OTHER PUBLICATIONS

Bruck et al., "Efficient Algorithms for All-to-All Communications in Multiport Message-Passing Systems", IEEE Transactions on Parallel and Distributed Systems, Nov. 1997, pp. 1143-1156, vol. 8, No. 11, IEEE Computer Society, USA.

Faraj et al., "MPI Collective Communications on The Blue Gene/P Supercomputer—Algorithms and Optimizations", National Centre for Supercomputing Applications (NCSA), www.scc.acad.bg (online), Sep. 2010, 23 pp., URL: http://www.scc.acad.bg/ncsa/articles/library/BLue%20Gene%20P/MPI%20Collective%20Communications%20on%20The%20Blue%20Gene%20P.pdf.

* cited by examiner

EXECUTING AN ALL-TO-ALLV OPERATION ON A PARALLEL COMPUTER THAT INCLUDES A PLURALITY OF COMPUTE NODES

BACKGROUND OF THE INVENTION

Field of the Invention

The field of the invention is data processing, or, more specifically, methods, apparatus, and products for executing an all-to-allv operation on a parallel computer that includes a plurality of compute nodes.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can be embodied as parallel computer that include a large number of compute nodes. Such compute nodes can participate in collective operations where the compute nodes exchange significant amounts of data. As the number of compute nodes that participate in a particular collective operation increases, improving the performance of the collective operations becomes valuable.

SUMMARY OF THE INVENTION

Methods, apparatuses, and products for executing an all-to-allv operation on a parallel computer that includes a plurality of compute nodes, including: packing, by each task in an operational group of tasks, vectored contribution data from vectored storage in an all-to-allv contribution data buffer into an all-to-all contribution data buffer, wherein two or more entries in the all-to-allv contribution data buffer are different in size and each entry in the all-to-all contribution data buffer is identical in size; executing with the contribution data as stored in the all-to-all contribution data buffer an all-to-all collective operation by the operational group of tasks; and unpacking, by each task in the operational group of tasks, received contribution data from the all-to-all contribution data buffer into the vectored storage in an all-to-allv contribution data buffer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
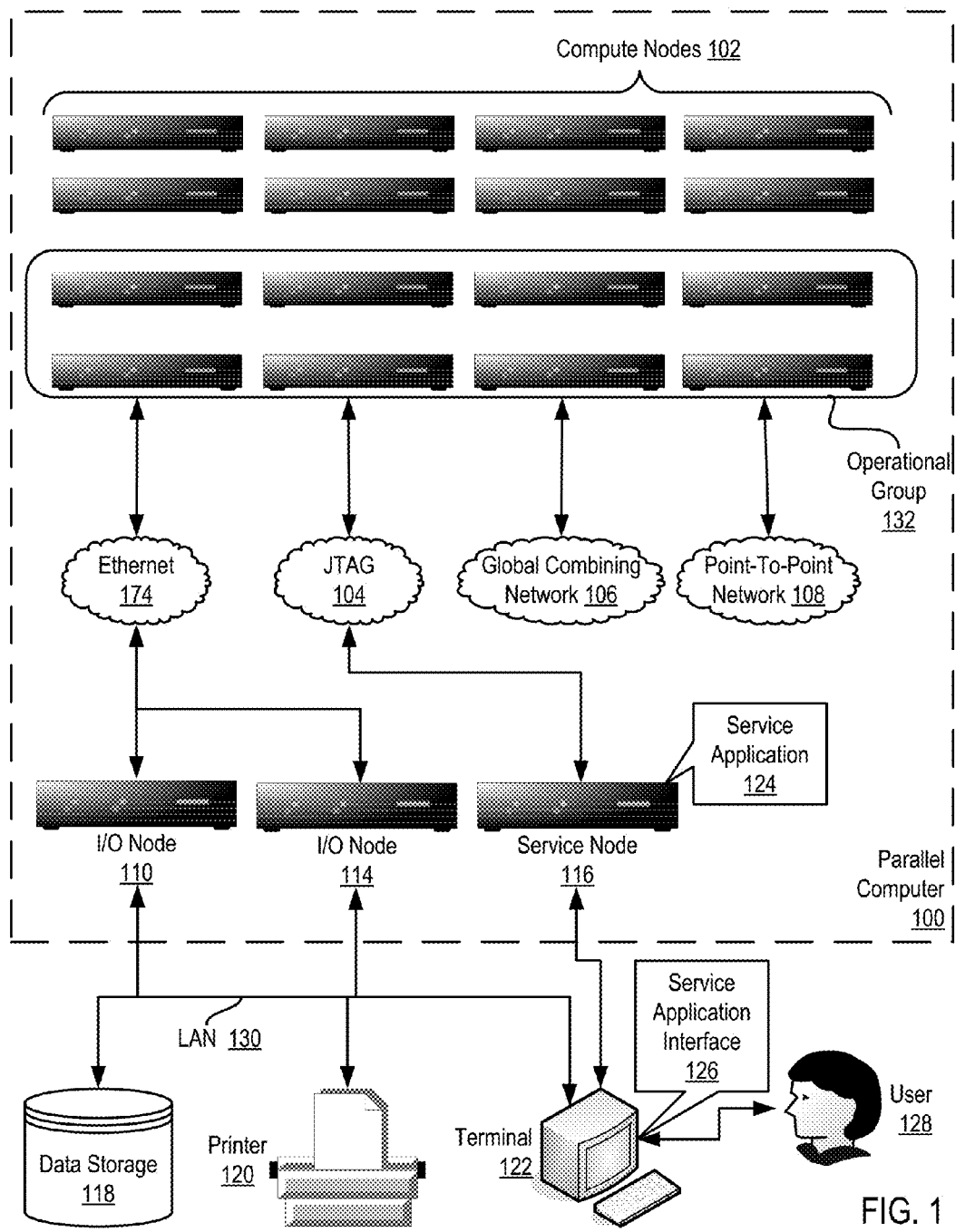
FIG. 1 illustrates an example system for executing an all-to-allv operation on a parallel computer that includes a plurality of compute nodes according to embodiments of the present invention.

Example methods, apparatuses, and products for executing an all-to-allv operation on a parallel computer that includes a plurality of compute nodes in accordance with the present invention are described with reference to the accompanying drawings, beginning with FIG. 1. FIG. 1 illustrates an example system for executing an all-to-allv operation on a parallel computer that includes a plurality of compute nodes according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree.

Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for executing an all-to-allv operation on a parallel computer that includes a plurality of compute nodes in accordance with embodiments of the present invention. As mentioned above, some parallel application may be split into parallel processes or parallel tasks. For simplicity in this specification a single compute node is often described as executing a single task. Readers will understand however that a compute node may execute in any number of tasks. In the example of FIG. 1, each compute node (102) may execute a number of tasks where at least one of the compute nodes executes a number of tasks that is different than the number of tasks executed by another one of the compute nodes.

Executing an all-to-allv operation on a parallel computer according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of executing an all-to-allv operation according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

Figure 2:
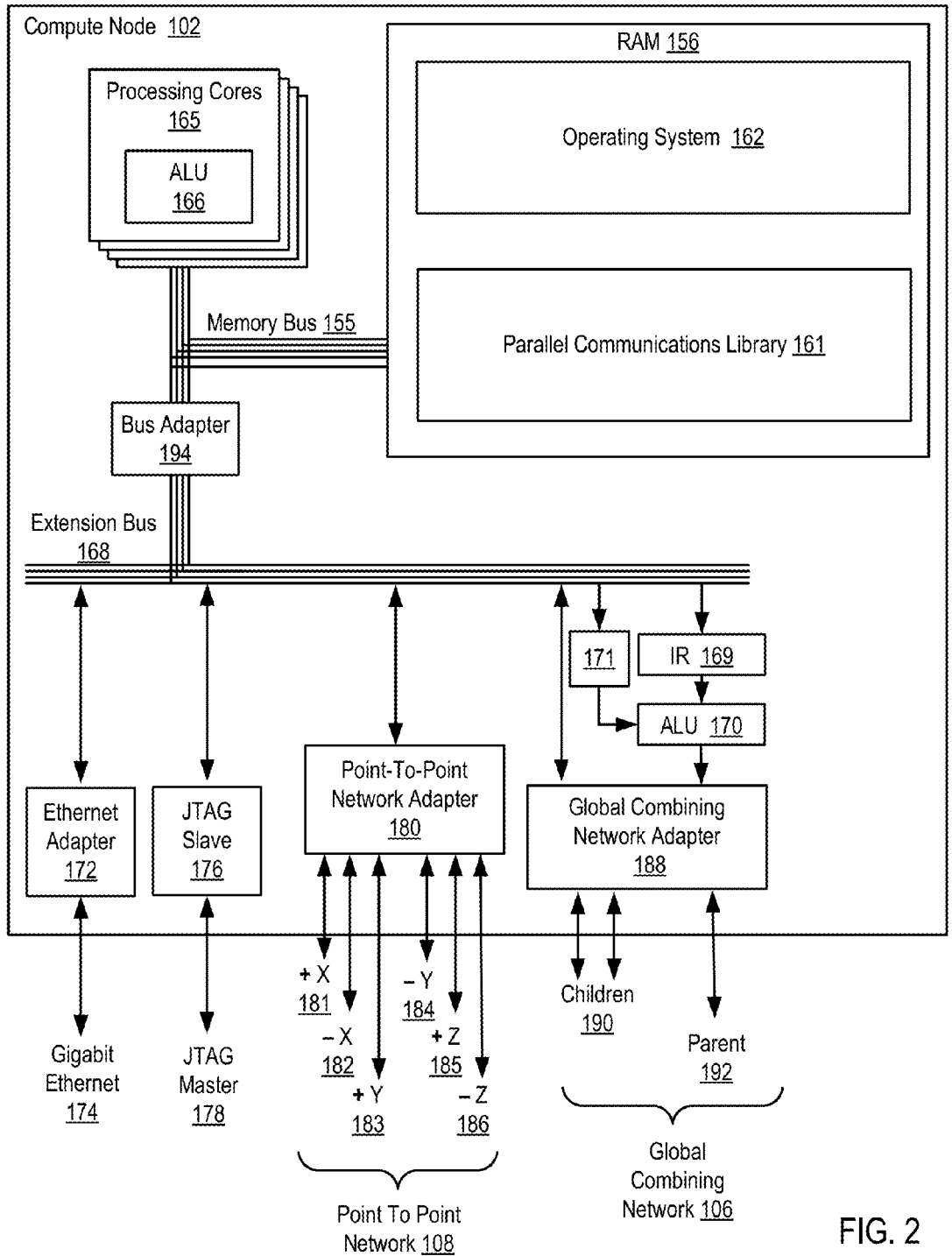
FIG. 2 sets forth a block diagram of an example compute node useful in a parallel computer capable of executing an all-to-allv operation according to embodiments of the present invention.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for executing an all-to-allv operation on a parallel computer that includes a plurality of compute nodes according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for executing an all-to-allv operation on a parallel computer that includes a plurality of compute nodes according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3:
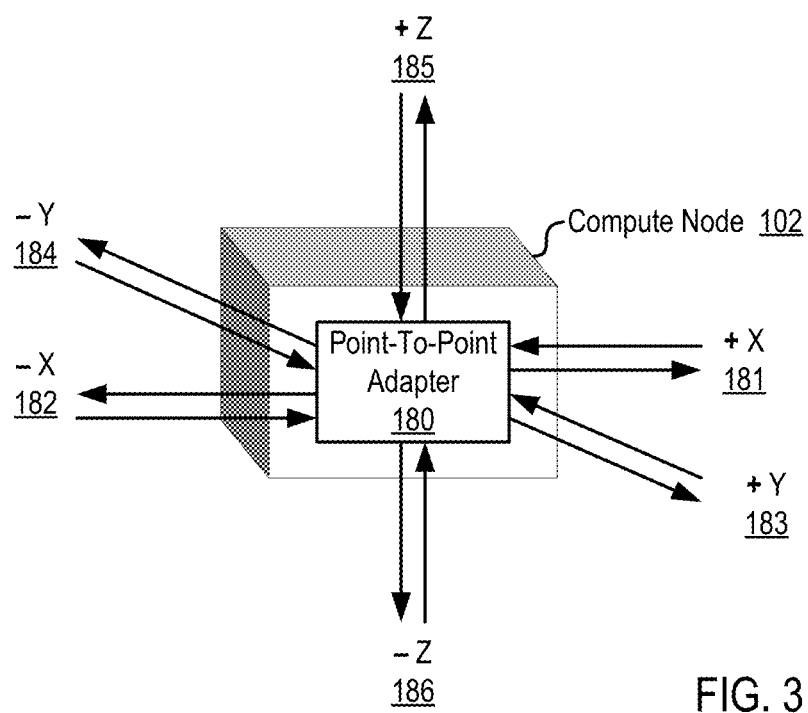
FIG. 3 sets forth a block diagram of an example Point-To-Point Adapter useful in systems for executing an all-to-allv operation on a parallel computer that includes a plurality of compute nodes according to embodiments of the present invention.

For further explanation, FIG. 3 sets forth a block diagram of an example Point-To-Point Adapter (180) useful in systems for executing an all-to-allv operation on a parallel computer that includes a plurality of compute nodes according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3 provides data communication along an x-axis through four unidirectional data communications links, to and from the next node in the −x direction (182) and to and from the next node in the +x direction (181). The Point-To-Point Adapter (180) of FIG. 3 also provides data communication along a y-axis through four unidirectional data communications links, to and from the next node in the −y direction (184) and to and from the next node in the +y direction (183). The Point-To-Point Adapter (180) of FIG. 3 also provides data communication along a z-axis through four unidirectional data communications links, to and from the next node in the −z direction (186) and to and from the next node in the +z direction (185).

Figure 4:
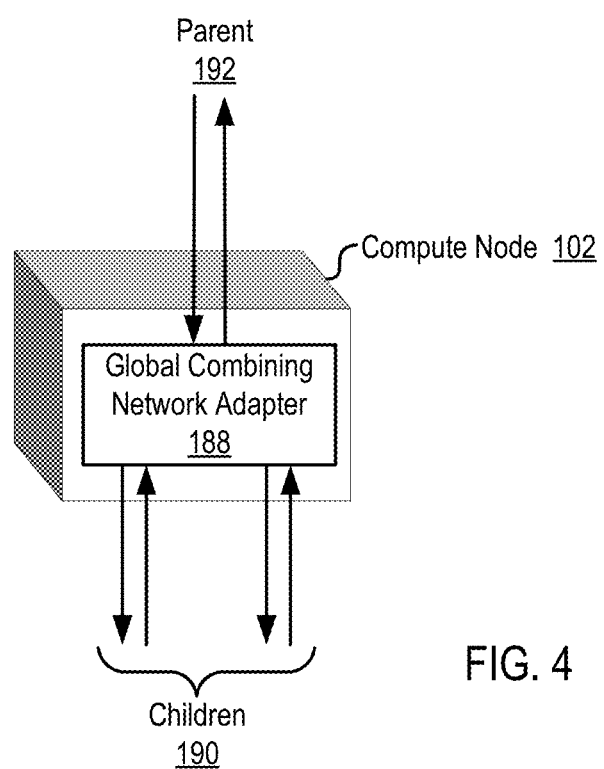
FIG. 4 sets forth a block diagram of an example Global Combining Network Adapter useful in systems for executing an all-to-allv operation on a parallel computer that includes a plurality of compute nodes according to embodiments of the present invention.

For further explanation, FIG. 4 sets forth a block diagram of an example Global Combining Network Adapter (188) useful in systems for executing an all-to-allv operation on a parallel computer that includes a plurality of compute nodes according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 4 provides data communication to and from children nodes of a global combining network through four unidirectional data communications links (190), and also provides data communication to and from a parent node of the global combining network through two unidirectional data communications links (192).

Figure 5:
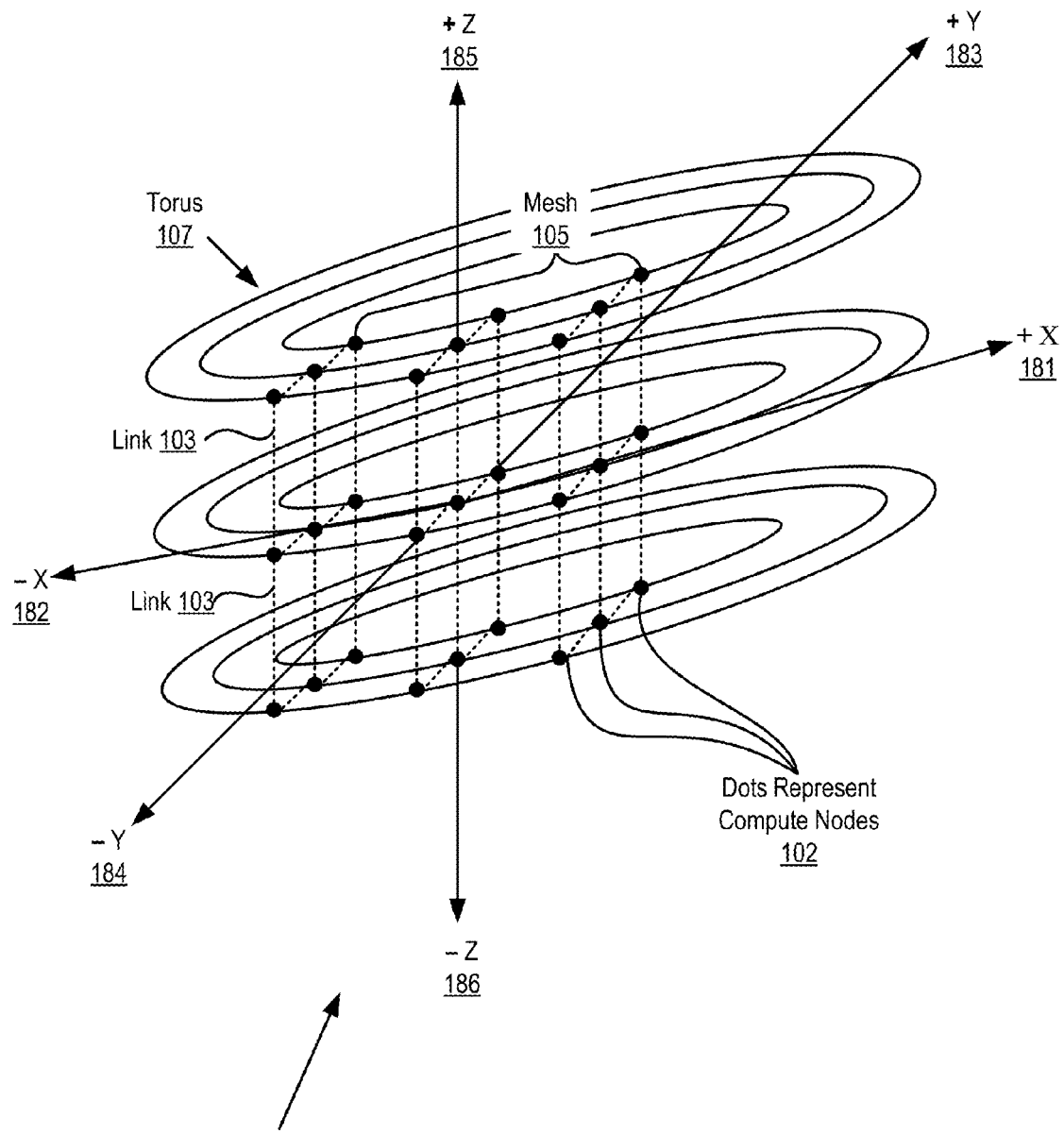
FIG. 5 sets forth a line drawing illustrating an example data communications network optimized for point-to-point operations useful in systems capable of executing an all-to-allv operation on a parallel computer that includes a plurality of compute nodes according to embodiments of the present invention.

For further explanation, FIG. 5 sets forth a line drawing illustrating an example data communications network (108) optimized for point-to-point operations useful in systems capable of executing an all-to-allv operation on a parallel computer that includes a plurality of compute nodes according to embodiments of the present invention. In the example of FIG. 5, dots represent compute nodes (102) of a parallel computer, and the dotted lines between the dots represent data communications links (103) between compute nodes.

The data communications links are implemented with point-to-point data communications adapters similar to the one illustrated for example in FIG. 3, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 5 is illustrated with only 27 compute nodes, but readers will recognize that a data communications network optimized for point-to-point operations for use in executing an all-to-allv operation on a parallel computer that includes a plurality of compute nodes in accordance with embodiments of the present invention may contain only a few compute nodes or may contain thousands of compute nodes. For ease of explanation, the data communications network of FIG. 5 is illustrated with only three dimensions, but readers will recognize that a data communications network optimized for point-to-point operations for use in distributing an executable job load file to compute nodes in a parallel computer in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 6:
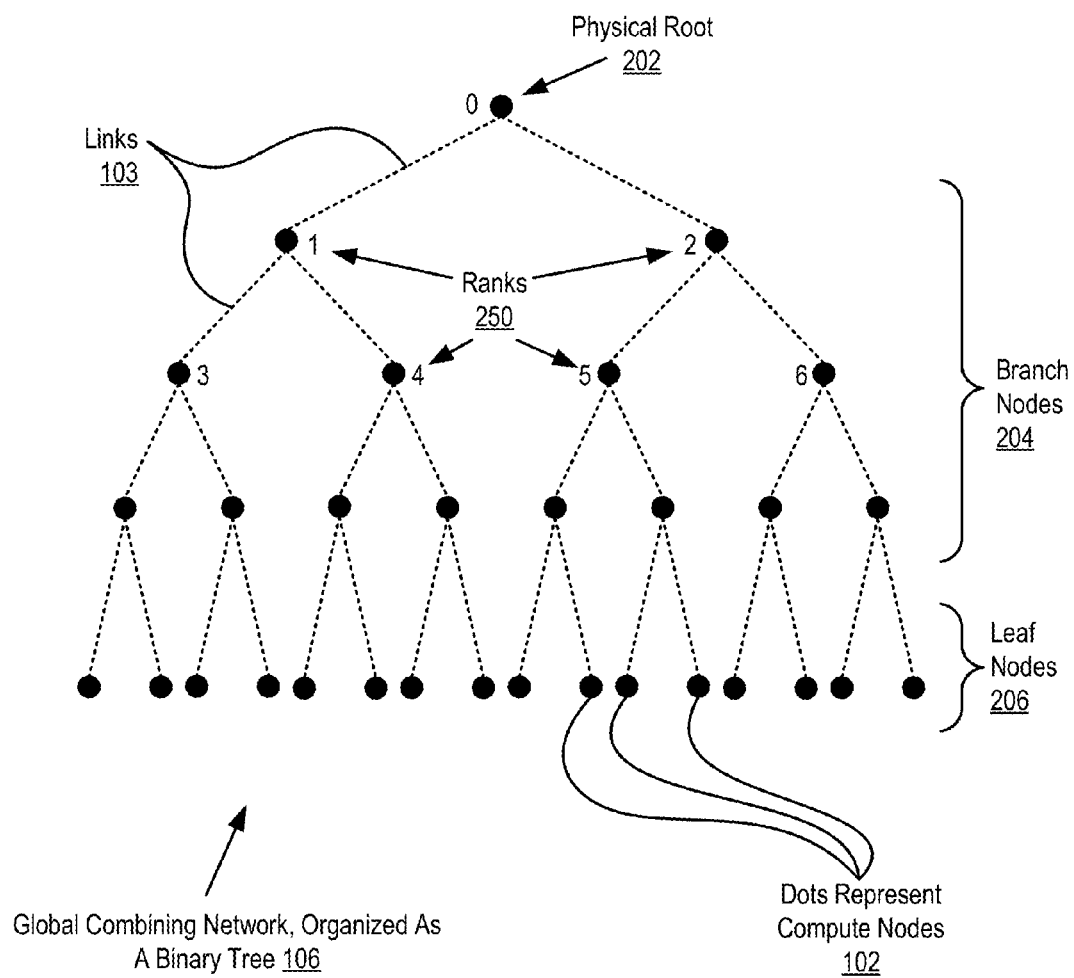
FIG. 6 sets forth a line drawing illustrating an example global combining network useful in systems capable of executing an all-to-allv operation on a parallel computer that includes a plurality of compute nodes according to embodiments of the present invention.

For further explanation, FIG. 6 sets forth a line drawing illustrating an example global combining network (106) useful in systems capable of executing an all-to-allv operation on a parallel computer that includes a plurality of compute nodes according to embodiments of the present invention. The example data communications network of FIG. 6 includes data communications links (103) connected to the compute nodes so as to organize the compute nodes as a tree. In the example of FIG. 6, dots represent compute nodes (102) of a parallel computer, and the dotted lines (103) between the dots represent data communications links between compute nodes. The data communications links are implemented with global combining network adapters similar to the one illustrated for example in FIG. 4, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 6 is illustrated with only 31 compute nodes, but readers will recognize that a global combining network (106) optimized for collective operations for use in executing an all-to-allv operation on a parallel computer that includes a plurality of compute nodes in accordance with embodiments of the present invention may contain only a few compute nodes or may contain thousands of compute nodes.

In the example of FIG. 6, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 7:
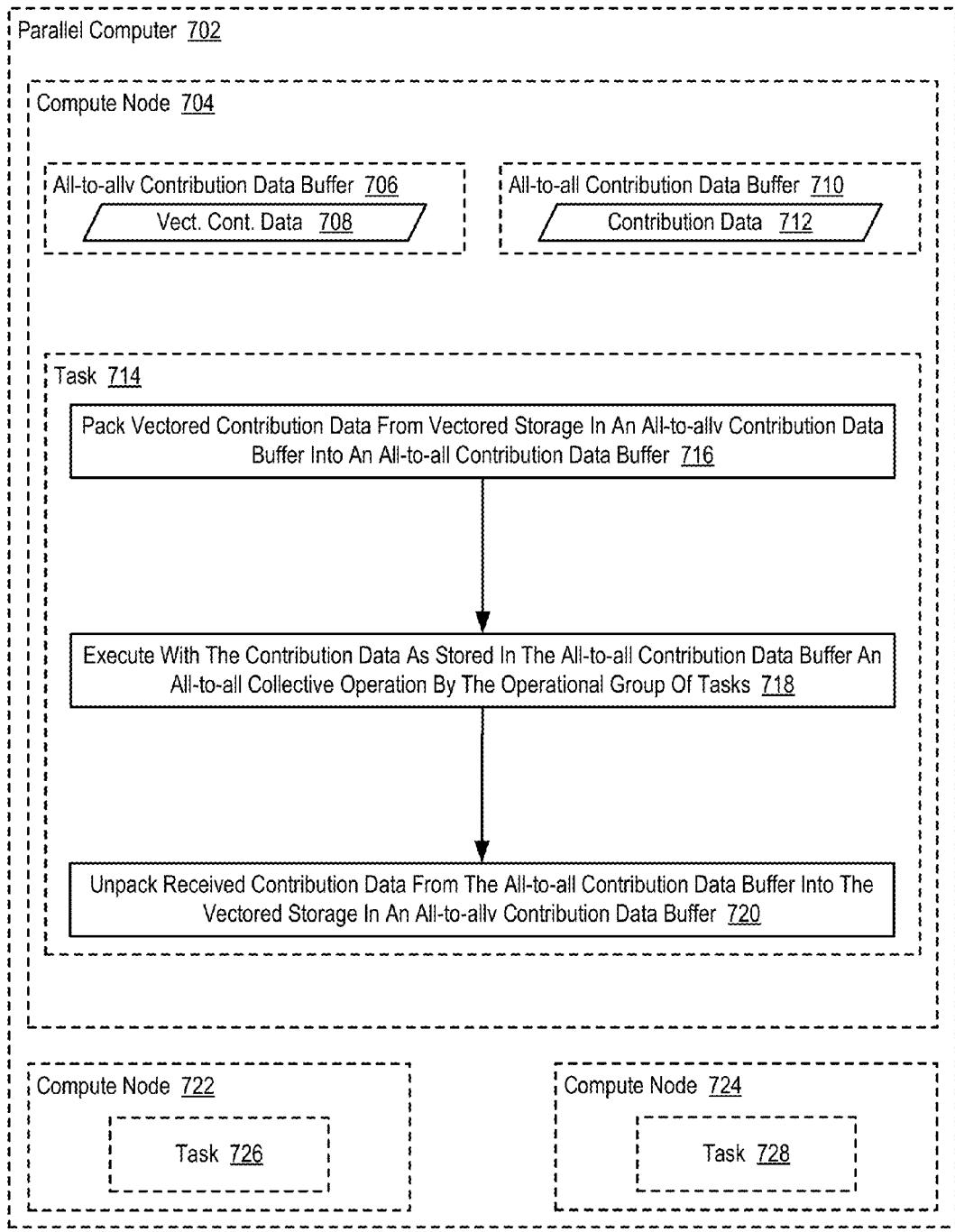
FIG. 7 sets forth a flow chart illustrating an example method for executing an all-to-allv operation on a parallel computer that includes a plurality of compute nodes according to embodiments of the present invention.

For further explanation, FIG. 7 sets forth a flow chart illustrating an example method for executing an all-to-allv operation on a parallel computer (702) that includes a plurality of compute nodes (704, 722, 724) according to embodiments of the present invention. The compute nodes (704, 722, 724) of FIG. 7 may be coupled for data communications over one or more data communications networks as illustrated above with reference to FIG. 1. For example, the compute nodes (704, 722, 724) may be coupled for data communications over data communications network such as an Ethernet network, a global combining network, a JTAG network, a point-to-point network, or any combination thereof as described above.

In the example method depicted in FIG. 7, an all-to-allv operation represents a communications operation in which each sender transmits messages to all receivers within a group, such as an operational group. In such example, each task participating in the execution of an all-to-allv collective operation sends data stored in a buffer to all other tasks participating in the execution of an all-to-allv collective operation. In addition, each task participating in the execution of the all-to-allv collective operation stores data received from the other tasks participating in the all-to-allv collective operation in a buffer. Consider an example in which three tasks are participating in the all-to-allv collective operation. Assume that each task has the following data in a buffer:

Task 0=$A_0, A_1, A_2$
Task 1=$B_0, B_1, B_2$
Task 2=$C_0, C_1, C_2$

Upon completion of the all-to-allv collective operation, each task would have the following data in its buffer:

Task 0=$A_0, B_0, C_0$
Task 1=$A_1, B_1, C_1$
Task 2=$A_2, B_2, C_2$

In the example method of FIG. 7, the all-to-allv collective operation is distinguishable from an all-to-all collective operation because the size of a particular piece of contribution data in an all-to-allv can be variable, whereas each piece of contribution data in an all-to-all must be of the same size. For example, in the example described above, $A_0$ may represent a 64 bit floating point value while $A_1$ represents a 32 bit integer.

In the example method of FIG. 7, the data that will be exchanged during the execution of an all-to-all collective operation may be stored in an all-to-all contribution data buffer (710). Likewise, the data that will be exchanged during the execution of an all-to-allv collective operation may be stored in an all-to-allv contribution data buffer (706). In view of the fact that the size of a particular piece of contribution data in an all-to-allv collective operation can be variable while each piece of contribution data in an all-to-all collective operation must be of the same size, the structure of the all-to-allv contribution data buffer (706) may differ from the structure of the all-to-all contribution data buffer (710). For example, the all-to-all contribution data buffer (710) may be embodied as an array or other data structure in which each entry is identical in terms of data type and size while the all-to-allv contribution data buffer (706) may be embodied as vectored storage such as a linked list or other data structure in which each entry in the all-to-allv contribution data buffer (706) can be of different in terms data type and size.

The example method depicted in FIG. 7 includes packing (716), by each task (714, 726, 728) in an operational group of tasks, vectored contribution data (708) from vectored storage in an all-to-allv contribution data buffer (706) into an all-to-all contribution data buffer (710). In the example method of FIG. 7, the vectored contribution data (708) for a particular task (714, 726, 728) represents the data that the particular task (714, 726, 728) will send to all other tasks (714, 726, 728) participating in the all-to-allv. In view of the fact that each piece of contribution data for an all-to-allv collective operation can be different in size, the all-to-allv contribution data buffer (706) of FIG. 7 includes two or more entries that are different in size. Furthermore, in view of the fact that each piece of contribution data for an all-to-all collective operation must be of the same size, the all-to-all contribution data buffer (710) of FIG. 7 includes entries that are all identical in size.

In the example method depicted in FIG. 7, packing (716), into an all-to-all contribution data buffer (710), vectored contribution data (708) from vectored storage in an all-to-allv contribution data buffer (706) may be carried out by determining a size for each entry in the all-to-all contribution data buffer (710) that will support each entry in the all-to-allv contribution data buffer (706). For example, packing (716) vectored contribution data (708) from an all-to-allv contribution data buffer (706) into an all-to-all contribution data buffer (710) may be carried out by identifying the size of the largest entry in the all-to-allv contribution data buffer (706) of each participating task (714, 722, 724) and setting the size of each entry in the all-to-all contribution data buffer (710) to a size that is equal to the size of the largest entry in the all-to-allv contribution data buffer (706). In such an example, upon setting the size of each entry in the all-to-all contribution data buffer (710) to a size that is equal to the size of the largest entry in the all-to-allv contribution data buffer (706), the vectored contribution data (708) in the all-to-allv contribution data buffer (706) may be packed (716) into the all-to-all contribution data buffer (710) by storing each entry in the vectored contribution data (708) in a slot in the all-to-all contribution data buffer (710).

Consider an example in which a particular task has contribution data that includes three entries, designated as $A_0$, $A_1$, $A_2$ stored in its all-to-allv contribution data buffer. Assume that $A_0$ represents a 32 bit integer, $A_1$ represents a 64 bit floating point value, and $A_2$ represents a 32 bit integer. In such an example, further assume that no other task (714, 722, 724) has data element larger than 64 bits in its contribution data. In such an example, packing (716) vectored contribution data (708) from an all-to-allv contribution data buffer (706) into an all-to-all contribution data buffer (710) may be carried out by setting the size of each slot in the all-to-all contribution data buffer (710) to 64 bits, storing $A_0$ in a first slot in the all-to-all contribution data buffer (710), storing $A_1$ in a second slot in the all-to-all contribution data buffer (710), and storing $A_2$ in a third slot in the all-to-all contribution data buffer (710). In such an example, because the first slot in the all-to-all contribution data buffer (710) and the third slot in the all-to-all contribution data buffer (710) only include 32 bits of contribution data, the remaining 32 bits of available space in each slot may be packed with predetermined filler data, such as null values.

The example method depicted in FIG. 7 also includes executing (718), with the contribution data (712) as stored in the all-to-all contribution data buffer (712), an all-to-all collective operation by the operational group of tasks (714, 722, 724). In the example method depicted in FIG. 7, executing (718) an all-to-all collective operation by the operational group of tasks (714, 722, 724) may be carried out by each task (714, 722, 724) sending the data in its all-to-all contribution data buffer (712) to all other tasks participating in the all-to-all collective operation. In such an example, each task (714, 722, 724) participating in the all-to-all collective operation may also receive contribution data from all other tasks (714, 722, 724) participating in the all-to-all collective operation in its buffer.

The example method depicted in FIG. 7 also includes unpacking (720), by each task (714, 722, 724) in the operational group of tasks, received contribution data from the all-to-all contribution data buffer (710) into the vectored storage in the all-to-allv contribution data buffer (706). In the example method of FIG. 7, after the all-to-all collective operation has been executed (718), the all-to-all contribution data buffer (710) for a particular task (714, 722, 724) will include data received from other tasks (714, 722, 724). In such an example, each task (714, 722, 724) may unpack (720) received contribution data from its all-to-all contribution data buffer (710) into vectored storage in its all-to-allv contribution data buffer (706). Unpacking (720) received contribution data from the all-to-all contribution data buffer (710) into the vectored storage in the all-to-allv contribution data buffer (706) may be carried out, for example, by inspecting each entry in the all-to-all contribution data buffer (710) and determining which portion of the data contained in each entry in the all-to-all contribution data buffer (710) represents contribution data received from another task (714, 722, 724).

Consider the example described above in which each entry in the all-to-all contribution data buffer (710) is set to a size of 64 bits and some of the slots in the all-to-all contribution data buffer (710) include only 32 bits of actual contribution data and 32 bits of predetermined filler data such as a null value integer. In such an example, unpacking (720) received contribution data from the all-to-all contribution data buffer (710) into the vectored storage in the all-to-allv contribution data buffer (706) may be carried out by identifying the portion of the data contained in each slot of the all-to-all contribution data buffer (710) that is actual contribution data and storing the actual contribution data in an appropriately sized entry in the vectored storage in the all-to-allv contribution data buffer (706).

Figure 8:
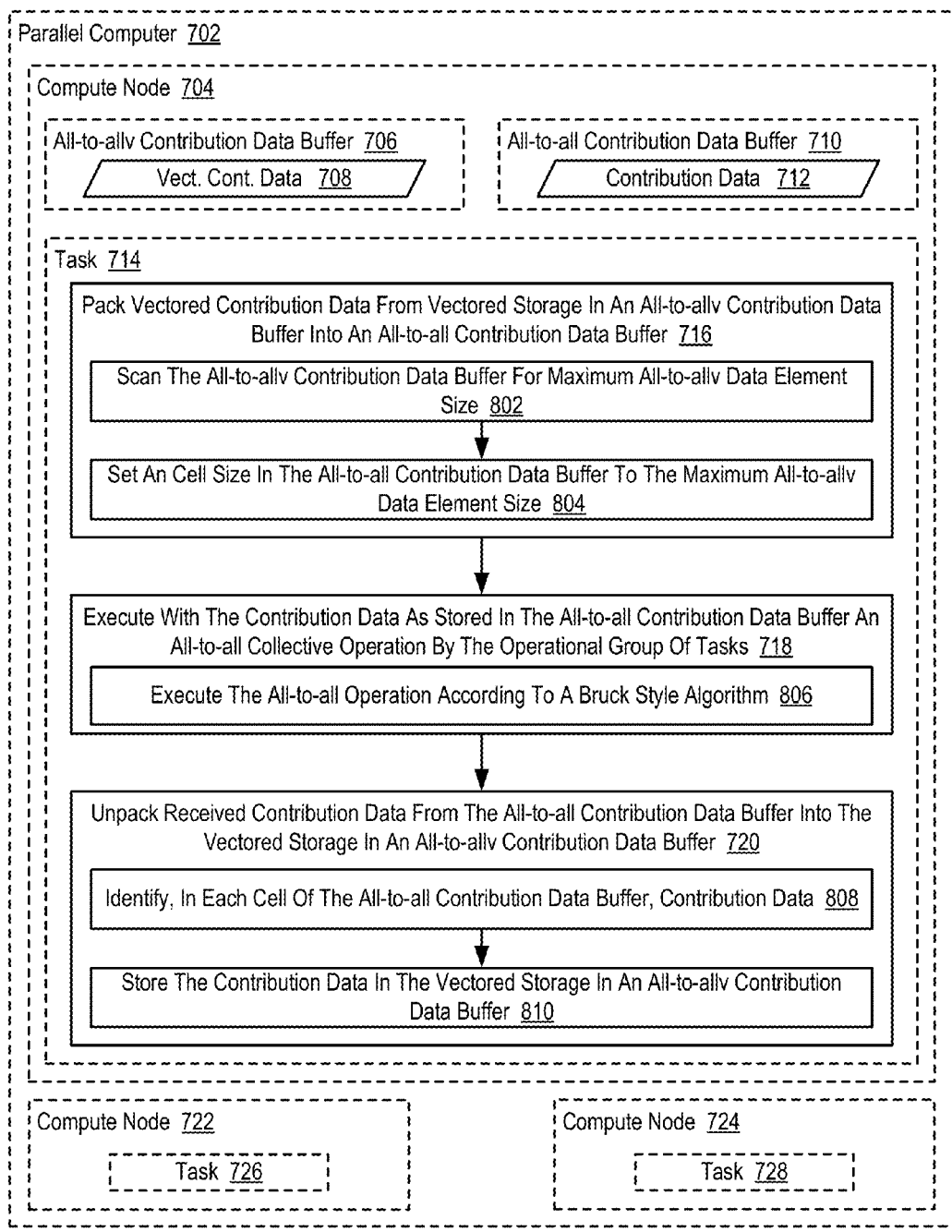
FIG. 8 sets forth a flow chart illustrating an additional example method for executing an all-to-allv operation on a parallel computer that includes a plurality of compute nodes according to embodiments of the present invention.

For further explanation, FIG. 8 sets forth a flow chart illustrating an additional example method for executing an all-to-allv operation on a parallel computer (702) that includes a plurality of compute nodes (704, 722, 724)

according to embodiments of the present invention. The example method depicted in FIG. 8 is similar to the example method depicted in FIG. 7, as the example method depicted in FIG. 8 also includes packing (716) vectored contribution data (708) from vectored storage in an all-to-allv contribution data buffer (706) into an all-to-all contribution data buffer (710), executing (718) with the contribution data (712) as stored in the all-to-all contribution data buffer (712) an all-to-all collective operation by the operational group of tasks (714, 722, 724), and unpacking (720) received contribution data from the all-to-all contribution data buffer (710) into the vectored storage in the all-to-allv contribution data buffer (706).

In the example method of FIG. 8, packing (716), by each task (714, 726, 728) in an operational group of tasks, vectored contribution data (708) from vectored storage in an all-to-allv contribution data buffer (706) into an all-to-all contribution data buffer (710) can include scanning (802) by each task (714, 726, 728) its all-to-allv contribution data buffer (706) for maximum all-to-allv data element size. In such an example, each task (714, 726, 728) may scan (802) its all-to-allv contribution data buffer (706) for maximum all-to-allv data element size by inspecting each element in the all-to-allv contribution data buffer (706), determining the size of each element in the all-to-allv contribution data buffer (706), and determining the size of the largest element in the all-to-allv contribution data buffer (706). In such an example, because each task (714, 726, 728) in the operational group of tasks may need to support contribution data elements received from another task (714, 726, 728) that are larger than the maximum all-to-allv data element size currently in its own all-to-allv contribution data buffer (706), each task (714, 726, 728) may communicate the maximum all-to-allv data element size currently in its own all-to-allv contribution data buffer (706) to each other task (714, 726, 728).

In the example method of FIG. 8, packing (716), by each task (714, 726, 728) in an operational group of tasks, vectored contribution data (708) from vectored storage in an all-to-allv contribution data buffer (706) into an all-to-all contribution data buffer (710) can also include setting (804) an cell size in the all-to-all contribution data buffer (710) to the maximum all-to-allv data element size. In the example method of FIG. 8, each cell the all-to-all contribution data buffer (710) represents a slot of other unit or other form of computer memory for containing a single element in a multi-element group data structure that collectively forms the contribution data (712). A cell may be embodied, for example, as an entry in an array, an entry in a linked list, and so on. In the example method depicted in FIG. 8, the size of each cell in the all-to-all contribution data buffer (710) may be set (804) to the maximum all-to-allv data element size, such that each cell in the all-to-all contribution data buffer (710) can support the largest element in the all-to-allv contribution data buffer (706) of each task (714, 726, 728).

In the example method depicted in FIG. 8, executing (718) an all-to-all collective operation by the operational group of tasks (714, 722, 724) can include executing (806) the all-to-all collective operation according to a Bruck style algorithm. In the example method of FIG. 8, a Bruck style algorithm represents an all-to-all operation as proposed by Jehoshua Bruck. An all-to-all operation executed according to a Bruck style algorithm is a logarithmic algorithm for short-message all-to-all that requires no extra bookkeeping or control information for routing the right data to the right task. The time required to execute an all-to-all operation according to a Bruck style algorithm is significantly reduced, especially for short messages.

In the example method depicted in FIG. 8, unpacking (720) received contribution data from the all-to-all contribution data buffer (710) into the vectored storage in the all-to-allv contribution data buffer (706) can include identifying (808), in each cell of the all-to-all contribution data buffer (710), received contribution data. In the example method of FIG. 8, the received contribution data represents contribution data received by a particular task (714, 726, 728) from other tasks (714, 726, 728) that are participating in the execution of an all-to-all collective operation. In such an example, because each task (714, 726, 728) that is participating in the execution of an all-to-all collective operation sends the entire contents of each cell in the all-to-all contribution data buffer (710) to the other tasks (714, 726, 728), the contribution data received by a particular task (714, 726, 728) may include contribution data as well as predetermined filler data that is packed (716) into an all-to-all contribution data buffer (710). In such an example, identifying (808) received contribution data may be carried out by identifying received data that is not filler data that is packed (716) into an all-to-all contribution data buffer (710).

In the example method depicted in FIG. 8, unpacking (720) received contribution data from the all-to-all contribution data buffer (710) into the vectored storage in the all-to-allv contribution data buffer (706) can include storing (810) the received contribution data in the vectored storage in the all-to-allv contribution data buffer (708). In the example method depicted in FIG. 8, storing (810) the received contribution data in the vectored storage in the all-to-allv contribution data buffer (708) may be carried by removing the filler data that is packed (716) into an all-to-all contribution data buffer (710) from the received data and storing the remaining received data in the all-to-allv contribution data buffer (708).

Figure 9:
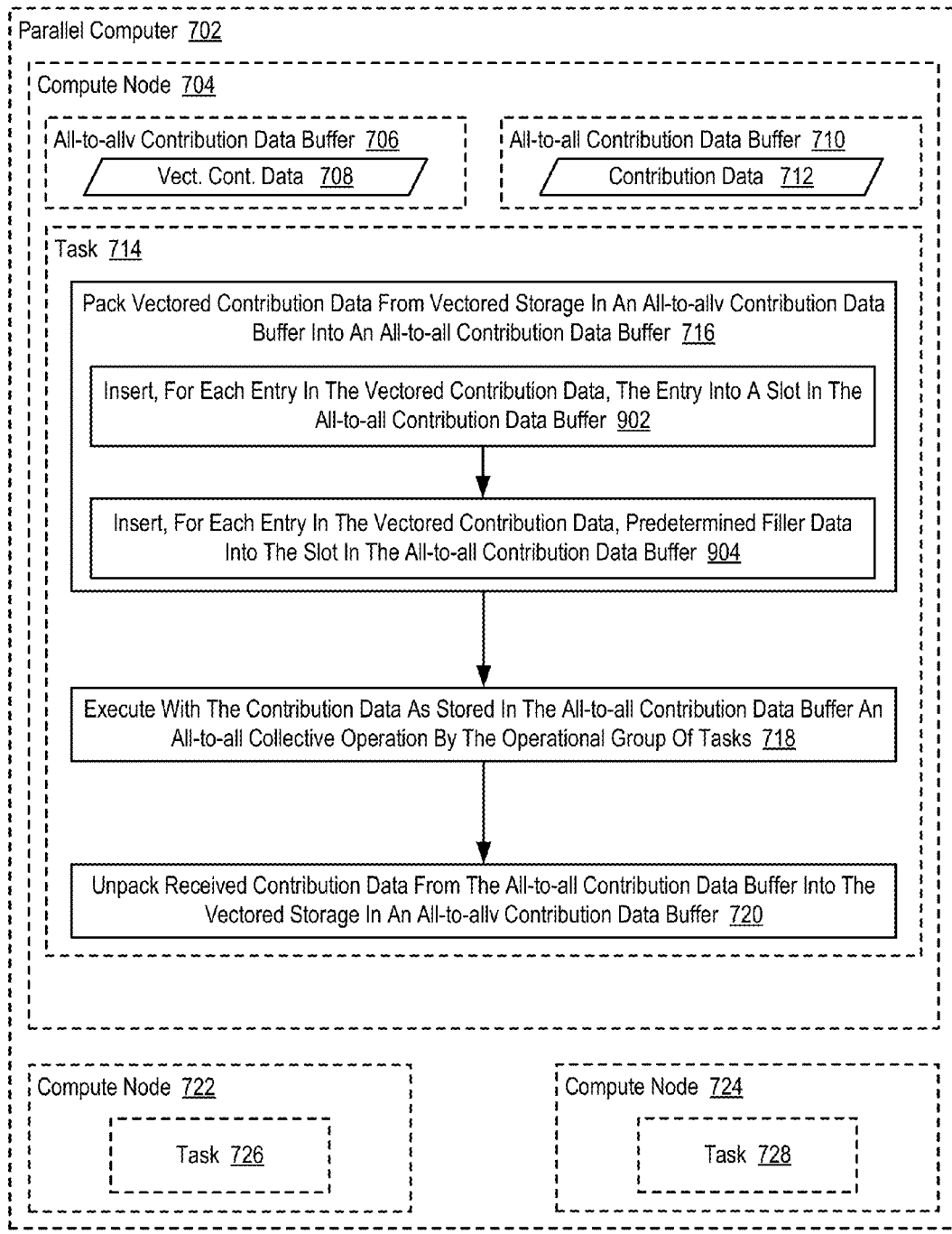
FIG. 9 sets forth a flow chart illustrating an additional example method for executing an all-to-allv operation on a parallel computer that includes a plurality of compute nodes according to embodiments of the present invention.

For further explanation, FIG. 9 sets forth a flow chart illustrating an additional example method for executing an all-to-allv operation on a parallel computer (702) that includes a plurality of compute nodes (704, 722, 724) according to embodiments of the present invention. The example method depicted in FIG. 9 is similar to the example method depicted in FIG. 7, as the example method depicted in FIG. 9 also includes packing (716) vectored contribution data (708) from vectored storage in an all-to-allv contribution data buffer (706) into an all-to-all contribution data buffer (710), executing (718) with the contribution data (712) as stored in the all-to-all contribution data buffer (712) an all-to-all collective operation by the operational group of tasks (714, 722, 724), and unpacking (720) received contribution data from the all-to-all contribution data buffer (710) into the vectored storage in the all-to-allv contribution data buffer (706). In the example method depicted in FIG. 9, the contribution data (712) may be characterized by a datatype that describes the layout of the contribution data (712) in computer memory.

In the example method depicted in FIG. 9, packing (716) vectored contribution data (708) from vectored storage in an all-to-allv contribution data buffer (706) into an all-to-all contribution data buffer (710) can include inserting (902), for each entry in the vectored contribution data buffer (706), the entry into a slot in the all-to-all contribution data buffer (710). In the example method depicted in FIG. 9, packing (716) vectored contribution data (708) from vectored storage in an all-to-allv contribution data buffer (706) into an all-to-all contribution data buffer (710) can also include inserting (904), for each entry in the vectored contribution data buffer (706), predetermined filler data into the slot in the all-to-all contribution data buffer (710).

Consider an example in which a particular task has contribution data that includes three entries, designated as $A_0$, $A_1$, $A_2$ stored in its all-to-allv contribution data buffer. Assume that $A_0$ represents a 32 bit integer, $A_1$ represents a 64 bit floating point value, and $A_2$ represents a 32 bit integer. In such an example, further assume that no other task (714, 722, 724) has data element larger than 64 bits in its contribution data. In such an example, inserting (902) the entry into a slot in the all-to-all contribution data buffer (710) and inserting (904) predetermined filler data into the slot in the all-to-all contribution data buffer (710) may be carried out by setting the size of each slot in the all-to-all contribution data buffer (710) to 64 bits, storing $A_0$ in a first slot in the all-to-all contribution data buffer (710), storing $A_1$ in a second slot in the all-to-all contribution data buffer (710), and storing $A_2$ in a third slot in the all-to-all contribution data buffer (710). In such an example, because the first slot in the all-to-all contribution data buffer (710) and the third slot in the all-to-all contribution data buffer (710) only include 32 bits of contribution data, the remaining 32 bits of available space in each slot may be packed with predetermined filler data, such as null values.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for executing an all-to-allv operation on a parallel computer that includes a plurality of compute nodes, the apparatus comprising a computer processor, a computer memory operatively coupled to the computer processor, the computer memory having disposed within it computer program instructions that, when executed by the computer processor, cause the apparatus to carry out the steps of:
packing, by each task in an operational group of tasks, vectored contribution data from vectored storage in an all-to-allv contribution data buffer with a variable data element size into an all-to-all contribution data buffer with a fixed data element size, wherein two or more entries in the all-to-allv contribution data buffer are different in size and each entry in the all-to-all contribution data buffer is identical in size, wherein packing includes:
scanning by each task the all-to-allv contribution data buffer for maximum all-to-allv data element size;
communicating, by each task, each task's maximum all-to-allv data element size to each other task in the operational group; and
setting a cell size in the all-to-all contribution data buffer to the maximum all-to-allv data element size;
executing, with the contribution data as stored in the all-to-all contribution data buffer, an all-to-all collective operation by the operational group of tasks; and
unpacking, by each task in the operational group of tasks, received contribution data from the all-to-all contribution data buffer into the vectored storage in an all-to-allv contribution data buffer.

2. The apparatus of claim 1 wherein executing the all-to-all collective operation further comprises executing the all-to-all collective operation according to a Bruck style algorithm.

3. The apparatus of claim 1 wherein unpacking, by each task in the operational group of tasks, received contribution data from the all-to-all contribution data buffer into the vectored storage in an all-to-allv contribution data buffer further comprises:
identifying, in each cell of the all-to-all contribution data buffer, received contribution data; and
storing the received contribution data in the vectored storage in the all-to-allvcontribution data buffer.

4. The apparatus of claim 1 wherein the contribution data is characterized by a datatype that describes the layout of the contribution data in computer memory.

5. The apparatus of claim 1 wherein packing, by each task in an operational group of tasks, vectored contribution data from vectored storage in an all-to-allv contribution data buffer into an all-to-all contribution data buffer further comprises:
inserting, for each entry in the vectored contribution data, the entry into a slot in the all-to-all contribution data buffer; and
inserting, for each entry in the vectored contribution data, predetermined filler data into the slot in the all-to-all contribution data buffer.

6. A computer program product for executing an all-to-allvoperation on a parallel computer that includes a plurality of compute nodes, the computer program product disposed upon a computer readable medium, wherein the computer readable medium is non-transitory, the computer program product comprising computer program instructions that, when executed, cause a computer to carry out the steps of:
packing, by each task in an operational group of tasks, vectored contribution data from vectored storage in an all-to-allv contribution data buffer with a variable data element size into an all-to-all contribution data buffer with a fixed data element size, wherein two or more entries in the all-to-allv contribution data buffer are different in size and each entry in the all-to-all contribution data buffer is identical in size, wherein packing includes:
scanning by each task the all-to-allv contribution data buffer for maximum all-to-allv data element size;
communicating, by each task, each task's maximum all-to-allv data element size to each other task in the operational group; and
setting a cell size in the all-to-all contribution data buffer to the maximum all-to-allv data element size;
executing, with the contribution data as stored in the all-to-all contribution data buffer, an all-to-all collective operation by the operational group of tasks; and
unpacking, by each task in the operational group of tasks, received contribution data from the all-to-all contribution data buffer into the vectored storage in an all-to-allv contribution data buffer.

7. The computer program product of claim 6 wherein executing the all-to-all collective operation further comprises executing the all-to-all collective operation according to a Bruck style algorithm.

8. The computer program product of claim 6 wherein unpacking, by each task in the operational group of tasks, received contribution data from the all-to-all contribution data buffer into the vectored storage in an all-to-allv contribution data buffer further comprises:
identifying, in each cell of the all-to-all contribution data buffer, received contribution data; and
storing the received contribution data in the vectored storage in the all-to-allv contribution data buffer.

9. The computer program product of claim 6 wherein the contribution data is characterized by a datatype that describes the layout of the contribution data in computer memory.

10. The computer program product of claim 6 wherein packing, by each task in an operational group of tasks, vectored contribution data from vectored storage in an all-to-allv contribution data buffer into an all-to-all contribution data buffer further comprises:
inserting, for each entry in the vectored contribution data, the entry into a slot in the all-to-all contribution data buffer; and
inserting, for each entry in the vectored contribution data, predetermined filler data into the slot in the all-to-all contribution data buffer.

11. The computer program product of claim 6 wherein the computer readable medium comprises a storage medium.

* * * * *